Nov. 11, 1952 C. C. RAUSCH 2,617,410
MECHANICAL RESUSCITATOR
Filed Dec. 6, 1949 7 Sheets-Sheet 1

INVENTOR:
CHESTER C. RAUSCH
by Dike, Calver & Porter
Attys.

Fig.5

Nov. 11, 1952     C. C. RAUSCH     2,617,410
MECHANICAL RESUSCITATOR

Filed Dec. 6, 1949     7 Sheets-Sheet 5

INVENTOR:
CHESTER C. RAUSCH
by Dike, Calver & Porter
Attys.

Nov. 11, 1952      C. C. RAUSCH      2,617,410
MECHANICAL RESUSCITATOR
Filed Dec. 6, 1949      7 Sheets-Sheet 6

INVENTOR=
CHESTER C. RAUSCH

Nov. 11, 1952 — C. C. RAUSCH — 2,617,410
MECHANICAL RESUSCITATOR
Filed Dec. 6, 1949 — 7 Sheets-Sheet 7

INVENTOR=
CHESTER C. RAUSCH
by Dike, Calver & Porter
Attys.

Patented Nov. 11, 1952

2,617,410

UNITED STATES PATENT OFFICE 2,617,410

MECHANICAL RESUSCITATOR

Chester C. Rausch, Watertown, Mass., assignor to Mechanical Resuscitator Corporation, Boston, Mass., a corporation of Massachusetts Application December 6, 1949, Serial No. 131,353

6 Claims. (Cl. 128—29)

This invention relates to resuscitating apparatus, and more particularly to the type of mechanical resuscitator having two cylinders, a positive or exhaust cylinder which sucks into itself a supply of air or gas or both and pushes it into a patient for inhalation or inspiration, and a negative or intake cylinder which sucks the gaseous fluids from the patient's lungs, causing exhalation or expiration, and exhausts the same to the atmosphere. Such cylinders have heretofore been employed, and have worked on much the same principle as a bicycle pump. The present invention, though based on the general principle above outlined, avoids the tiresome pumping action by the operator which has heretofore been necessary, and provides more accurate control of the amounts of gaseous fluid used, the rate of inspiration and expiration, and the ratio of the plurality of gases sometimes employed, such as air and pure oxygen. One object of the invention is to enable the operator to use a rotary cranking motion instead of a pumping motion. Other primary objects are to control accurately the ratio or mixture of gases used, from 100% of either to any proportionate part of both, to provide indicator means enabling the operator to observe instantly the rate of inspiration and expiration, and to make it correspond to the volume of gas or mixture of gases used, to enable the operator to predetermine the volume of gases and to change the volume easily either before or during operation, in which latter event the rate of inhalation and exhalation may be quickly and easily changed with accuracy, and to provide certain safety measures, such as a relief supply of air in the event of short supply of other gas, and pressure relief systems for both cylinders to avoid dangerous pressure on the patient.

The nature and objects of the invention will best be understood from the following description in conjunction with the accompanying drawings, in which.

Figure 2:
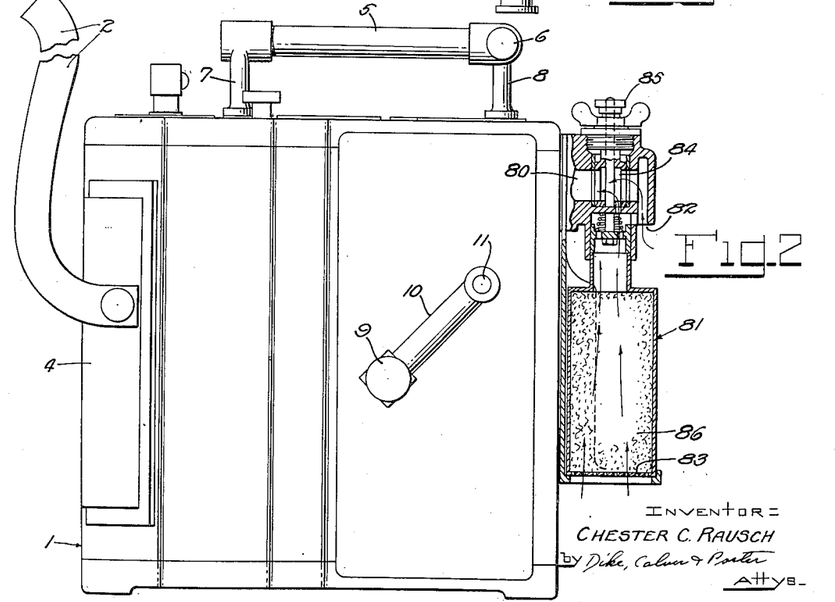
Fig. 2 is a side elevation, partly in section, of the resuscitator shown in Fig. 1.
Figure 3:
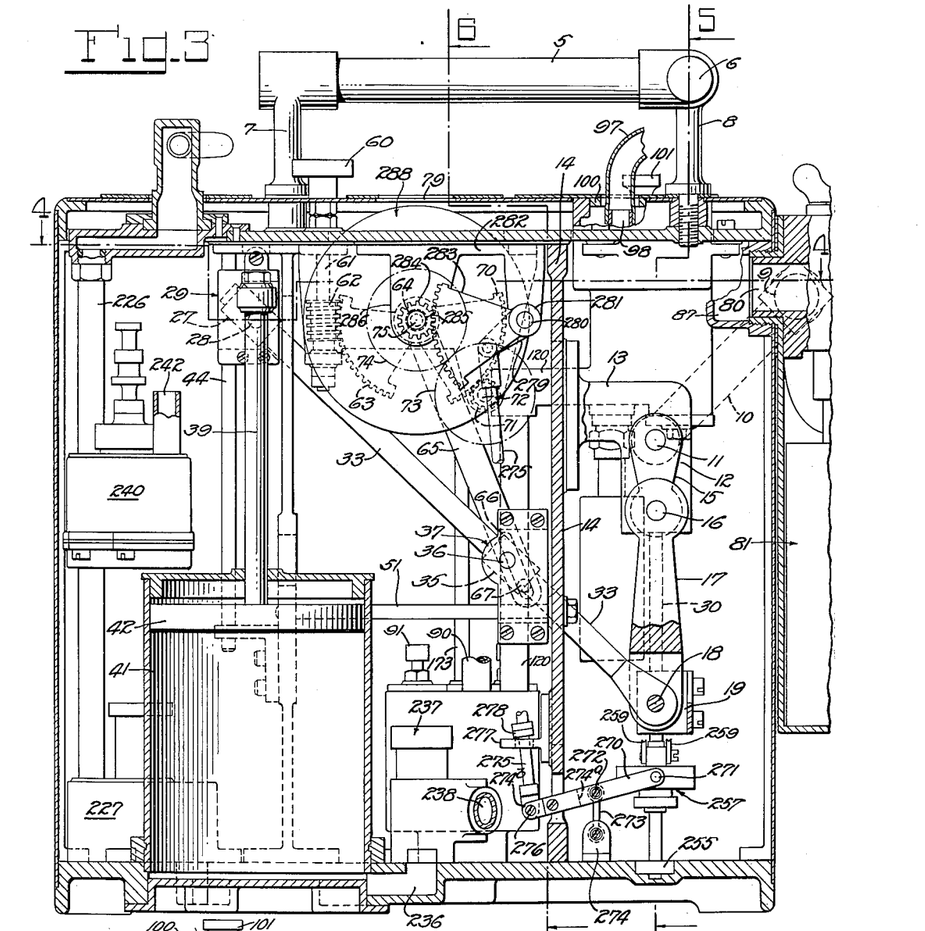
Fig. 3 is a vertical section taken substantially on the line 3—3 of Figs. 1 and 4.
Figure 4:
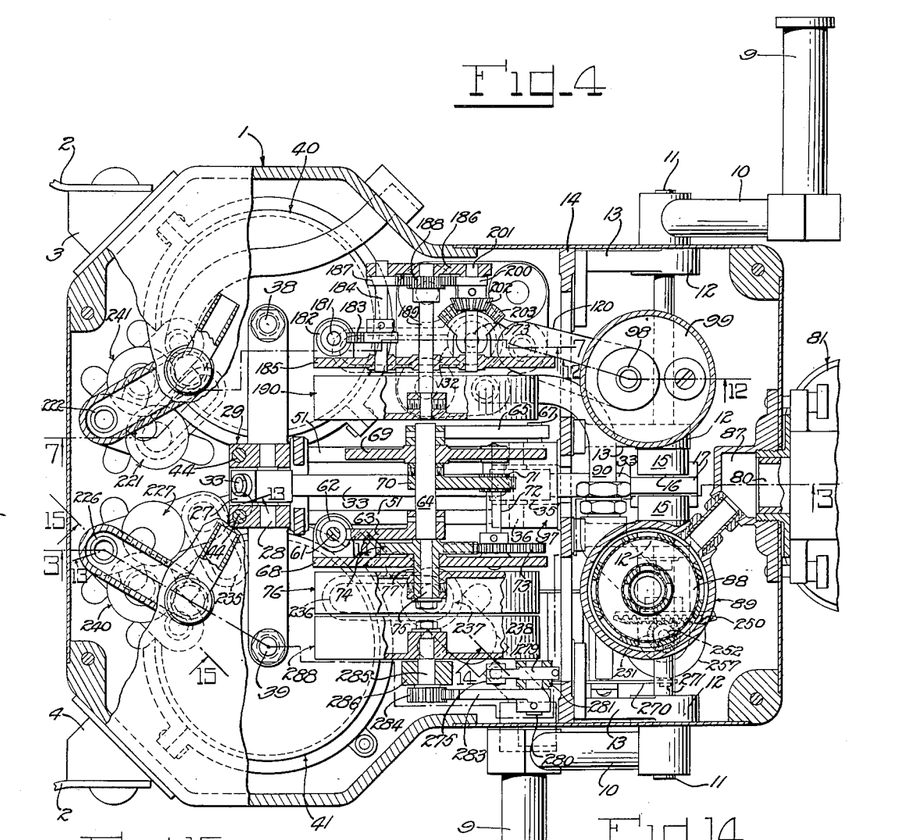
Fig. 4 is a horizontal section taken substantially on the line 4—4 of Fig. 3.
Figure 5:
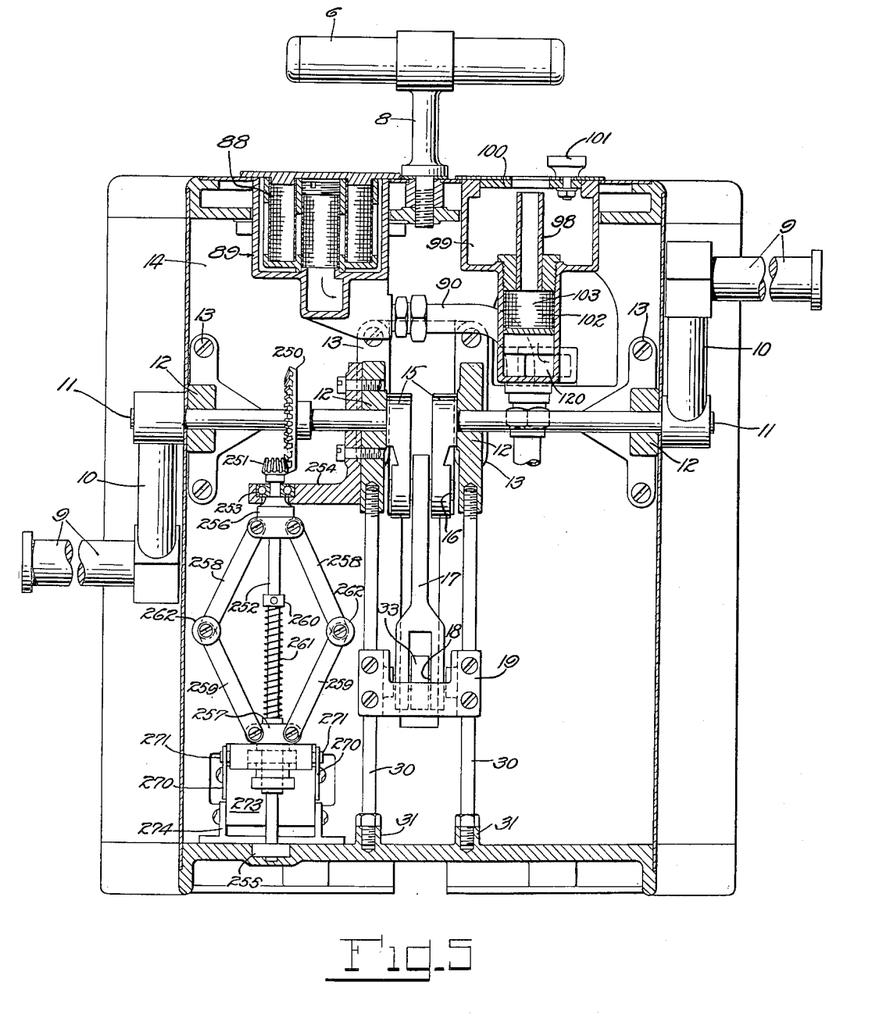
Figs. 5 and 6 are vertical sections taken substantially on the lines 5—5 and 6—6 respectively of Fig. 3.

In the drawings, the resuscitator has a casing generally indicated at 1 provided with a carrying strap 2 secured to lugs 3 and 4 (Fig. 1) and with a carrying handle 5 (Figs. 1 and 2) and steadying handle or cross arm 6 held spaced from the top of the casing by posts 7 and 8. Crank handles 9—9 are carried by arms 10—10 secured to a crank shaft 11 (Figs. 1, 3, 4 and 5) which is journalled in bearings 12—12 in brackets 13—13 secured to a partition 14 (Figs. 4 and 5). The crank shaft 11 is provided with crank arms 15 and a crank pin 16 (Fig. 5). The crank pin 16 carries a connecting rod 17, the bifurcated lower end of which is journalled on the pin 18 of a sliding crosshead 19.

Figure 6:
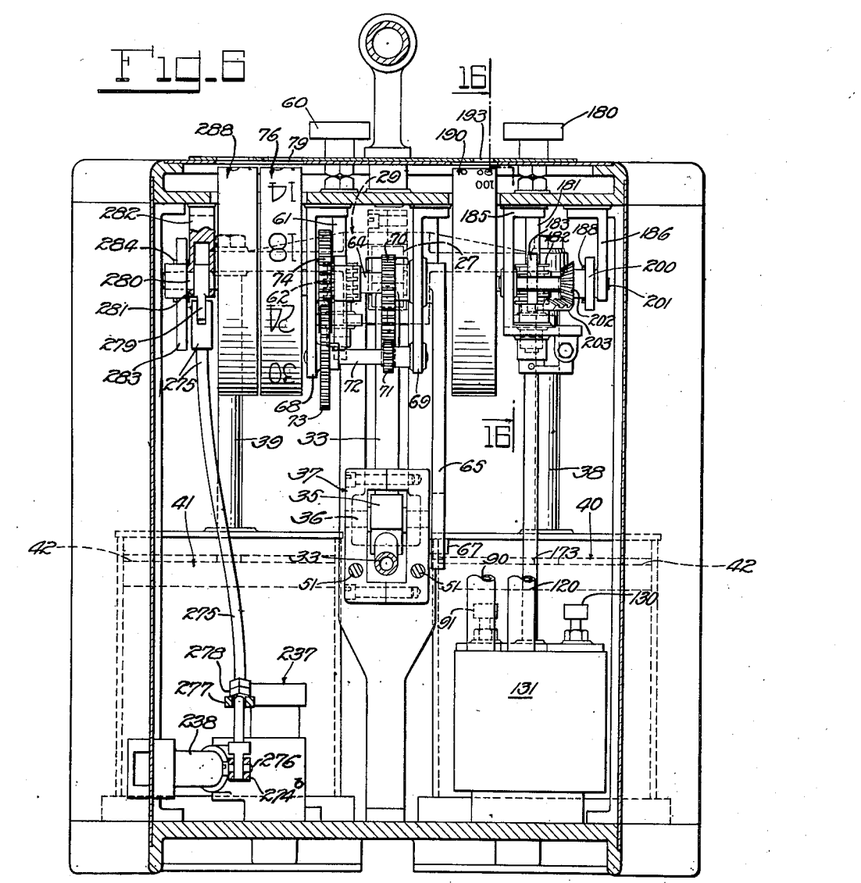

The crosshead 19 is guided in ways 30—30 secured to bosses 31—31 and the inner brackets 13—13 extending from the partition 14. Pivotally mounted on the pin 18 there is a drive rod 33 (Fig. 3) which is slidably mounted in a trunnion block 35 pivoted at 36 to a fulcrum block 37 (Fig. 4). At its outer end the drive rod 33 is slidably mounted in a trunnion block 27 pivoted at 28 to a crosshead 29 which is connected to piston rods 38 and 39 (Figs. 3, 4 and 6). As best seen in Figs. 3 and 4, piston rods 38 and 39 extend into cylinders 40 and 41, respectively. Each rod carries a piston 42 which closely fits the cylinder walls, and on movement therein, produces compression or suction within said cylinders. The crosshead 29 is slidably mounted on guides 44—44.

Figure 18:
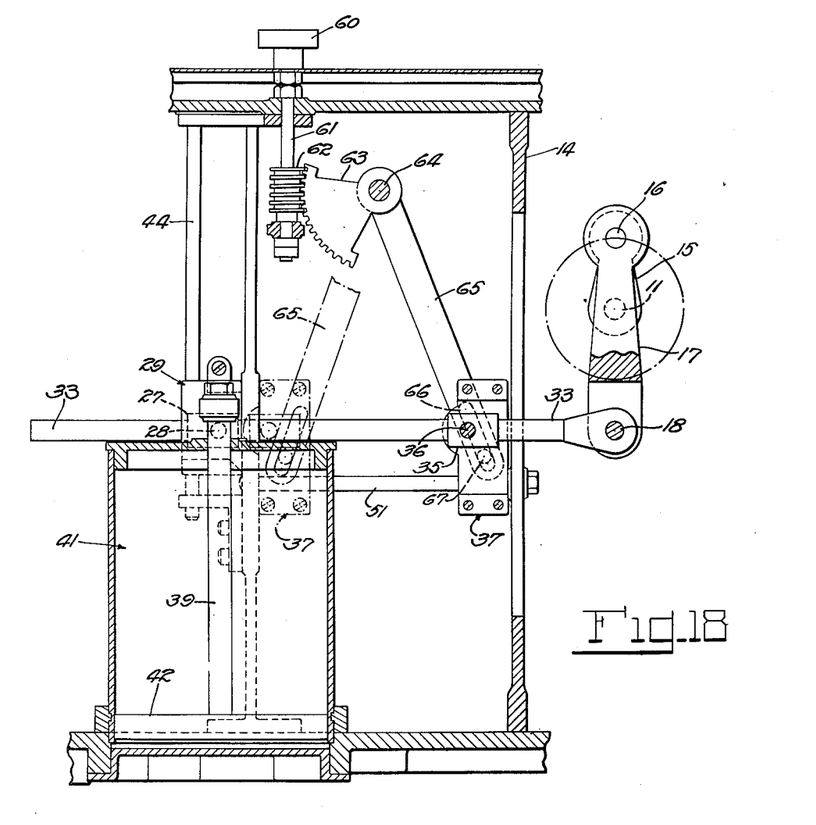
Fig. 18 is a view of the volume control mechanism shown separately and with the parts in a different relation from that shown in Fig. 3.

The extent to which said pistons are moved depends on the position of trunnion block 35 as determined by the position of the fulcrum block 37 in which said trunnion block is mounted. The fulcrum block 37 is guided for adjustment on ways 51—51 (Figs. 3, 6 and 18). When the fulcrum block 37 is at the extreme right as viewed in Figs. 3 and 18, the fulcrum for the drive rod 33, constituted by the trunnion block 35, is nearest the crank-operated end of the rod 33 with the result that the pistons 42 are raised to their highest possible point in the cylinders 40 and 41. When the fulcrum block 37 is moved to the extreme left to the position indicated by dot-and-dash lines in Fig. 18, the fulcrum for the drive rod 33 is nearest the crosshead 29 with the result that the pistons are moved through a shorter operating stroke. The bottom of the stroke is always in the same place, regardless of the length of stroke.

In order to provide for a longer or a shorter stroke, a knob 60 (Figs. 3, 4, 6 and 18) is turned to rotate a shaft 61, worm gear 62, segmental gear 63, and shaft 64. Shaft 64 causes an arm 65 mounted thereon to be swung. The lower end of this arm is provided with a long narrow slot 66 (Figs. 3 and 18) which receives a pin 67 extending from the fulcrum block 37. Thus rotation of the knob 60 slides the fulcrum block 37 along its guide rods 51 to lengthen or shorten the stroke of the pistons.

Figure 17:
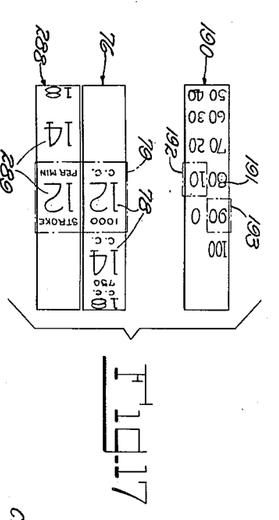
Fig. 17 is a plan view of the drums shown detached.

At the same time, when knob 60 is turned, shaft 64, which is rotatably mounted in frame brackets 68 and 69 (Figs. 4 and 6) turns segmental gear 70 which is fast thereto. Gear 70 rotates pinion 71 (Fig. 3) on shaft 72 journalled in frame brackets 68 and 69, causing rotation of gear 73 which is secured to said shaft. Gear 73 meshes with and rotates equal gear 74 which has the same diameter gear 73 and which is freely mounted on shaft 75. Shaft 75 is a coaxial shaft passing through shaft 64. Rotation of gear 74 causes rotation of drum 76 (Figs. 4, 6 and 17) which is secured on a hub 77 extending therefrom. Drum 76 is provided with peripheral marking 78 (see Fig. 17) which appear under window 79 in casing 1. When the operator turns the knob 60, he can perceive on the peripheral scale whether the volume of gas and/or air to be or being administered to the patient meets the requirements of the particular patient. If it does not, he can shorten or lengthen the stroke while reading the scale until it indicates the amounts required and being or to be delivered.

Figures 7, 8, 9, 10, 11:
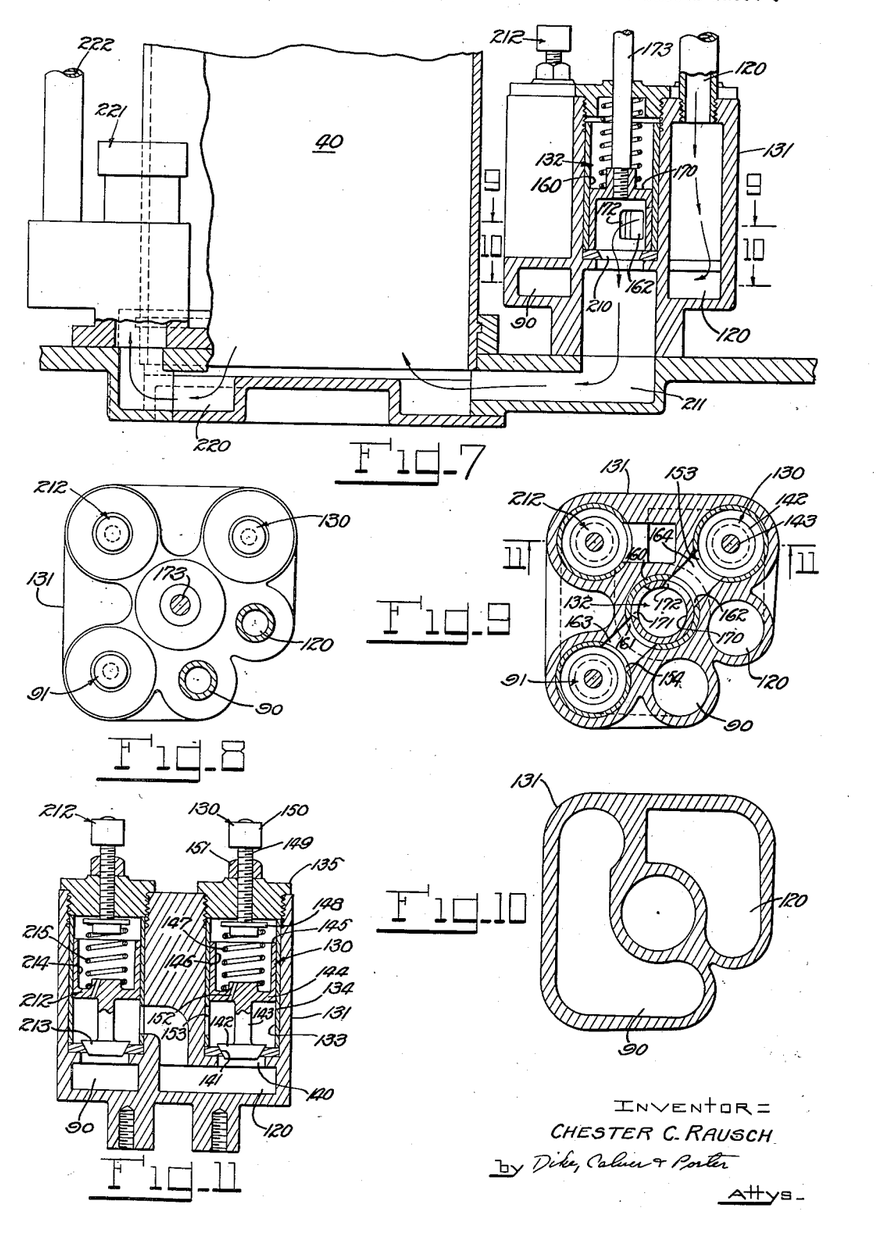
Fig. 7 is a vertical section taken on the line 7—7 of Fig. 4 through the mixing valve.
Fig. 8 is a plan view of the mixing valve.
Figs. 9 and 10 are horizontal sections of the mixing valve taken on the lines 9—9 and 10—10 of Fig. 7.
Fig. 11 is a vertical section of the mixing valve taken on the line 11—11 of Fig. 9.

Air may be admitted directly from the outside atmosphere through a port 80 (Fig. 3) or through a purifying tank 81 (Figs. 1 and 2) having a direct inlet 82, a second inlet 83, a valve 84 operated by a knob 85 and a chamber 86 which may be filled with a chemical adapted to filter air or to remove or nullify noxious materials. Air from the chemical chamber may be drawn through ports 82 or 83; the operator will turn the knob 85 to admit air directly from the atmosphere if it is usable, but will turn it to admit air drawn through the chemical canister 86 if the atmosphere is contaminated with poisonous or harmful material. From the valve 84 (or from port 80, if the canister is not used) the air passes through passage 87 to a mechanical filter 88 in a filter chamber 89 which will prevent the passage of dust, etc. Thence the air passes by conduit 90 to an air inlet valve generally indicated at 91 (Fig. 9). The canister can be attached when necessary, but is not essential to the operation of the resuscitator. As hereinafter explained, the air may not be mixed with gas, but if gas is required by the patient, it will be supplied by the following described mechanism.

Figure 1:
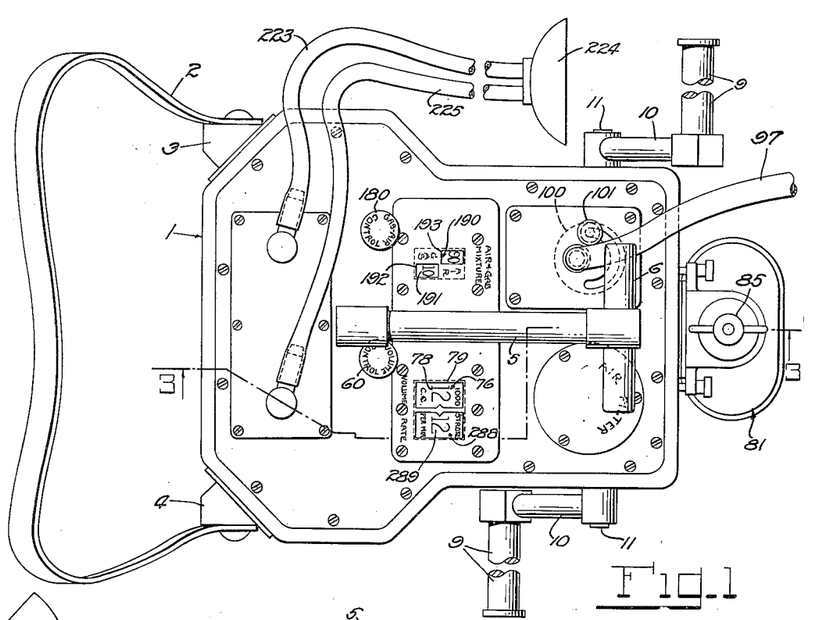
Fig. 1 is a plan view of a resuscitator embodying the invention.

As shown in Figs. 1 and 3, a flexible tube 97 is provided to carry gas from a suitable pressure chamber or bottle (not shown). Tube 97 admits gas to intake tube 98 (Figs. 4, 5 and 12) which is preferably located in a chamber 99 provided with a swingable cover 100 having a handle or knob 101. From the tube 98, the gas passes to chamber 102 which is provided with a strainer 103. From chamber 102 the gas or mixture of gases passes through port 104 into chamber 105 of a valve body generally indicated at 106.

Figure 12:
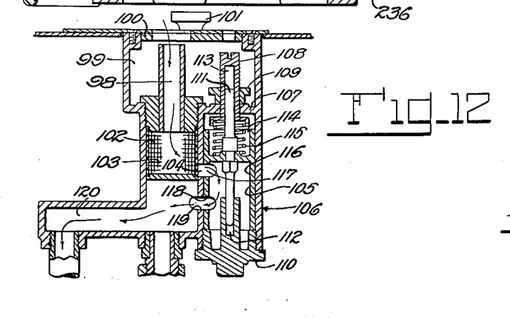
Fig. 12 is a vertical section of the gas control valve taken on the line 12—12 of Fig. 4.

Valve body 106 may be a part of the casing surrounding chamber 102 and inlet 98. It has a top closure 107, adjusting screw 108, lock nut 109, bottom closure 110, central guide pin 111 reciprocally movable in well 112 in bottom closure 110 and in well 113 in adjusting screw 108, spring chamber or well 114, spring 115, and valve sleeve 116. Valve sleeve 116 has intake port 117 and outlet port 118. Port 117 is normally opposite port 104 of the intake filter chamber, and port 118 is normally opposite port 119 in a conduit 120. Adjusting screw 108 is turned to increase or decrease the spring pressure, causing partial or full closing of the ports when the supply pressure is excessive.

Valve 116 can be used to decrease the pressure of the gas, if that has not already been accomplished adequately at the source. Guide pin 111 also acts as a stop, so that the valve ports can never be fully closed by downward travel of the valve sleeve 116 on adjustment of screw 108.

Gas passes through conduit 120 to a gas inlet check valve 130 (Fig. 11). Gas inlet valve 130 and air inlet valve 91 have the same construction, and therefore only valve 130 is described in detail. The casing 131 for valve 130 is also, in the construction shown, the casing for valve 91, for adjacent parts of the air and gas conduits heretofore described, and for a mixing valve 132 (Figs. 4, 7 and 9).

Valve 130 has a chamber 133 encompassed by cylinder 134 in casing 131 and cap 135 screw threaded to said casing over said cylinder. The bottom of the cylinder has an inlet port 140 provided with a valve seat 141 in which intermittently rests valve cap 142 carried on rod 143 on piston 144 having walls 145 defining a spring chamber 146. Spring 147 in said chamber is carried between said piston and a movable head 148 carried on rod 149 screw threaded in said cap 135 and carrying on its outer end a knob 150. Gas admitted to valve cap 142 under pressure forces it upwardly against the force exerted by the spring, the force of which can be varied by turning the knob 150. A lock nut 151 can be employed to prevent change in the tension setting of the spring. A bleeder or bypass 152 is used to equalize pressures on both sides of the piston to prevent a "dash pot" action.

Gas admitted to gas inlet valve 130 (or air to inlet valve 91) is available to mixing valve 132 via ports 153 in valve 130 and 154 in valve 91. Whether all of the gas or all of the air available, or some proportionate mixture of both will be utilized, depends on the operation of said mixing valve.

Mixing valve 132 is disposed approximately in the middle of casing 131 and between air and gas inlet valves 91 and 130. The valve cylinder 160 has two opposed ports 161 and 162, port 161 being connected to air outlet port 154 of valve 91 by conduit 163, and port 162 being connected to gas port 153 by a conduit 164.

The mixing valve 132 comprises essentially a rotatable sleeve 170 mounted in the cylinder 160. As shown in Fig. 9, this sleeve has two ports 171 and 172 disposed at an angle to each other. The median lines of said ports may be at an angle of 90°. When one port is fully open, the other is fully closed. When one fully open port is in complete registry with a port in the cylinder wall, the other valve port will then be completely blocked by the cylinder wall. Rotation of the sleeve by turning shaft 173, (Fig. 7) will open a closed port at the expense of the open port; i. e. one opening is increased in proportion as the other is decreased. Thus the gas-to-air ratio may be 0:100; 25:75; 50:50; 75:25 or 100:0, and any desired ratio in between any of the illustrative figures given.

Figure 16:
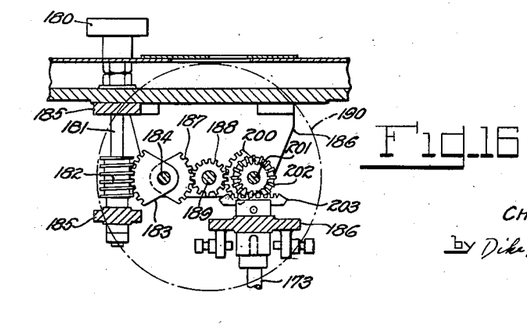
Fig. 16 is a vertical section taken substantially on the line 16—16 of Fig. 6.

The mechanism for turning valve shaft 173 to vary the mixture in the mixing valve will be best observed in Figs. 4, 6 and 16. The knob 180, which extends outside of casing 1, is fastened to a shaft 181 journaled in said casing, and said shaft carries a worm gear 182 which meshes with segmental gear 183 on shaft 184 journaled in brackets 185 and 186 of the frame. Shaft 184 carries segmental gear 187 which meshes with gear 188 on shaft 189 journaled in said brackets. Shaft 189 carries drum 190 secured thereto, said drum having on its peripheral surface a scale 191 indicating the various possible parts of air-gas mixture ranging from 100% of either to 0% of either through windows 192 and 193 in the casing. The scale carries offset figures, i. e. one part will read in descending order and the other in ascending order, and the windows are likewise offset to reveal portions of the scale which are not opposed. Gear 188 also meshes with segmental gear 200 carried on shaft 201 journaled in said brackets and shaft 201 carries beveled gear 202 which meshes with a second beveled gear 203 secured to valve shaft 173. Turning the knob 180 causes rotation of the valve sleeve to vary the mixture of air and gas. The operator thus can turn the knob to set the mixing valve sleeve for a 50-50 mixture, or any other ratio, as indicated on the scale 191 carried by the drum.

Normally, the mixture called for by the mixing valve will be drawn through a port 210 (Fig. 7) into a conduit 211 which leads to pump cylinder 40, which will be referred to as the exhaust or inspiration cylinder because air or gas or both are forced from it to the patient for inspiration. However, it may happen that the gas supply might fail, or be cut off, and that suction through the gas intake valve would not be effective to pull in the proper amount of gas. If the patient is, for example, using 50% of gas and 50% of air, loss of one half of the total volume would be extremely serious, as suffocation might soon result. For this reason, a so-called "starvation" valve 212 is provided. It has the same construction as the air intake and gas intake valves, but its supply is derived from the air conduit 90 which leads to the air intake valve. Its valve cap 213 (Fig. 11) normally does not rise to admit air, because there is no suction to cause its piston 214 to overcome the force of its spring 215. However, its exhaust side is connected with the gas intake valve supply conduit 140, and if there is no gas present to pass through the gas intake, the vacuum created in the line due to the lack of gas causes the starvation air valve to open, and air instead of gas will pass through the gas intake valves to the mixing valve, and be added to the proportion of air called for by the mixing valve. Thus while the gas supply is being repaired, the patient will get the same total volume as before. Of course, there will be no occasion for operation of the emergency or "starvation" valve if the mixing valve is set for 100% air and 0% gas, and the need for air will be greatest if the gas supply should fail with the mixing valve set for 0% air and 100% gas.

Whatever air or gas or mixture of the two reaches the pump cylinder 40, the same proportions and the same volume will be expelled into the patient's lungs.

When the piston 42 in cylinder 40 is raised, the air or gas or mixture will be sucked into the cylinder 40 by the creation of a partial vacuum. This force lifts the intake valves heretofore described, and draws in the air from outside the resuscitator. The gas supplied to the gas intake valve will usually be under pressure, and the gas intake valve will be so controlled that it will offset the pressure of the gas. It will, therefore, be furnished to the mixing valve at atmospheric pressure, and drawn with the air to the exhaust cylinder on the upstroke of the piston.

When the piston is lowered, the air, gas or mixture cannot be expelled past the intake valves, which serve as check valves, and so the gaseous contents of the cylinder are exhausted by way of conduit 220 (Fig. 7). From conduit 220 the gaseous fluid passes into a check valve generally indicated at 221, which is constructed according to the same principles as the gas and air inlet valves heretofore described, and thence passes through conduit 222, tube 223 (Fig. 1) and mask 224 to the face of the patient.

When the piston 42 in the cylinder 40 has finished its stroke and started to rise, the piston sucks more gaseous fluid from the mixing valve and, at the same time, the piston 42 in the cylinder 41 rises and creates suction on the patient's lungs, the contents thereof passing through the mask 224, intake tube 225, and conduit 226 to an inlet check valve 227.

Figure 13:
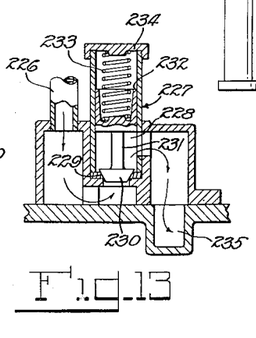
Fig. 13 is a vertical section taken on the line 13—13 of Fig. 4 through the inlet valve associated with one of the cylinders.

Valve 227 is for the purpose of permitting the contents of a patient's lungs to be drawn into the cylinder 41 while preventing the down stroke of piston 42 in said cylinder from returning any of it to the patient. The construction is like that of the exhaust check valve 221, having (Fig. 13) a valve chamber 228, valve seat 229, valve head 230, valve stem 231, piston 232, and a spring 233 exerting pressure on said valve mounted between said piston 232 on said valve stem and a spring socket 234 in the casing.

Figure 14:
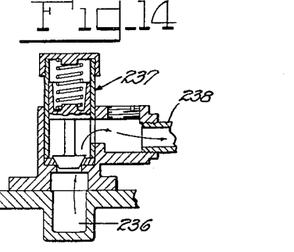
Fig. 14 is a vertical section of one of the outlet valves taken on the line 14—14 of Fig. 4.

Passing from valve 227, the intermittent flow continues through duct 235 to the bottom of cylinder 41. From the cylinder, it passes through conduit 236 to check valve 237 on the down stroke of the piston 42. Valve 237 is of the same construction as the valve 227 above described, and provides for one-way passage of gaseous fluid from the cylinder 41 to the atmosphere via vent pipe 238 (Fig. 14).

Figure 15:
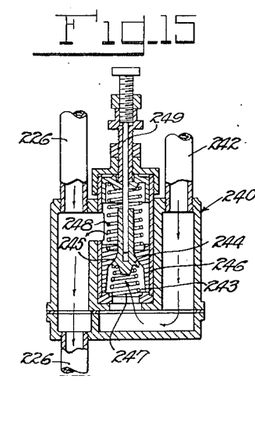
Fig. 15 is a vertical section of one of the relief valves taken on the line 15—15 of Fig. 4.

A relief valve 240 is also provided (see Fig. 15) for admitting air to the negative or expiration cylinder 41 if required, and a similarly constructed relief valve 241 is provided for the exhaust line from the positive cylinder. The construction of both is shown in Fig. 15, where, in the valve 240, air is admitted through an intake tube 242 to a chamber 243 which is normally closed by a valve cap 244 which is urged by a spring 247 against the valve seat 245 of a sleeve 246. A spring 248 presses against the sleeve.

Ordinarily, the valve is closed as shown in Fig. 15, and even slight suction on the main intake line from the patient to the negative cylinder will not open the valve. A slight suction will offset the force of spring 248, permitting the sleeve to rise, and the valve cap and seat are still in contact. Excessive suction in the line, however, causes the sleeve to be raised to the point where the inside of valve cap 244 strikes the end of pin 249, which also serves as a guide for the valve cap. When the two engage, the valve cap cannot move farther under the impulse of spring 247, while the suction continues to pull upwardly on the sleeve. This effects the separation of valve cap and valve seat, and the air follows the course from inlet pipe 242 to intake tube 226 shown by arrows in the drawing.

Air drawn through the valve 241 will be taken from any excess in the positive cylinder which cannot be utilized by the patient. The construction of this valve is the same in principle as that of valve 240, but the flow of air from the tube 222 to the valve and from the valve to the atmosphere is the reverse of the flow shown in Fig. 15. It permits escape of surplus gaseous fluid from the exhaust cylinder when the patient cannot take all of the air or gas in the cylinder.

The speed with which the gaseous fluid is forced into and drawn from a patient will be determined by the speed of the pistons which will, in turn, depend on the speed with which the crank handles are turned. However, this speed should neither be too slow nor too fast, nor should it vary with the operator or the operator's judgment or state of mind. In order to provide an even and regular inspiration and expiration, I have provided a special indicating mechanism by which the operator is to be governed in the use of the device.

As shown in Fig. 5, a bevel gear 250 secured to the crankshaft 11 turns a bevel gear 251 on shaft 252 which is journaled in a bearing 253 held by bracket arm 254 which is secured to the frame, and in a bearing 255 which is carried by the base of the frame.

A collar 256 about the upper end of said shaft is held in place by said bracket, and a second collar 257 about the lower part of said shaft is free to slide longitudinally of said shaft. Said collars are connected by weighted lazy tongs links 258 and 259. A fixed collar 260 is placed intermediate the ends of said shaft, and a compression spring 261 is placed between collar 260 and collar 257, said spring tending to space apart as far as possible the first and second named collars. When the shaft is turned by the operator's turning the main crank, the speed of rotation causes the weighted mid-portion of said links indicated at 262 to spread laterally, the operation being that of an ordinary centrifugal governor. Fig. 5 shows the governor in an expanded condition.

When the lowermost collar 257 is raised by the centrifugally operated links, it moves upwardly one end of a pair of links 270 which are pivoted at 271 to said collar and pivoted at 272 to a link 273 pivoted to a bracket 274 on said frame. The inner ends of the links 270 are secured to a block 274a which carries a clevis 274b to which the lower end of a rod 275 is pivotally connected at 276. Rod 275 projects through an apertured bracket 277, and is provided with a stop nut 278 to prevent undesired extent of downward movement, i. e. enough to permit the weighted links to swing outwardly (or open up) too far. Rod 275 (Figs. 3 and 6) extends to and is pivotally connected to an arm 279 secured on a shaft 280 held in a bearing 281 in a bracket 282 secured to the frame. A segmental gear 283 fast on shaft 280 meshes with pinion 284 on shaft 285 journaled in bearing 286 in bracket 282. A drum 288 is secured to said shaft and carries thereon a scale 289 (Fig. 17) denoting speed of rotation and, therefore, the number of inspirations and expirations per minute. The figures are read through the window 79 in the top of the frame, and are closely adjacent the figures indicating volume. The operator will govern the speed of the crank, and therefore the volume of gaseous fluids inhaled and expelled, by making the figures indicating the speed of rotation figures coincide with the speed figures shown with any selected volume setting indicating the proper rate to crank for that volume setting.

In operation, the operator will determine, from the size and age of the patient, the proper volume of air or gas or mixture of the two required by the particular patient. He will thereupon turn the volume setting knob 60 until the desired volume appears in the window 79 on scale 78. This reading will also provide an arbitrary figure, such as 12 for a volume of 1000 cc. The mask (or a tracheal tube if preferred) will be attached to the patient. The supporting straps, if used, will be passed over the operator's shoulders and behind his neck. The resuscitator can be steadied by grasping the steadying handle 6 with either hand, and the crank can be turned with either hand. If the device does not require steadying, both hands may be used to crank.

The operator turns one or both of the crank handles, and the pistons start expelling air or gas into and withdrawing it from the patient. The volume setting has automatically provided for a piston stroke of the proper length to provide the right amount of gas or air or pre-set mixture and for a reading of that amount on the scale 78. The operator can shut off the gas or the air, or change the ratio, merely by turning the mixture setting knob 180. For example, setting it for 0 air and 100 gas, all air is shut off. Conversely, if only air is needed, a setting of 100% air and 0% gas will shut off the gas supply. If both are desired in a given proportion, such as 50–50, or if a change from one to the other is called for, the operator only has to turn the knob. The mixture so predetermined is indicated on scale 191 through windows 192 and 193.

As the crank handles are turned, the speed scale 289 automatically turns. The operator will know, or be provided with instructions, that the number of inhalations and exhalations per minute required will be the same as the "arbitrary" number on the volume scale, i. e. the scale which bears the data relating to speed carries numbers which will be correlated with the "arbitrary" numbers on the volume scale. For example, if twelve exhalations and inhalations per minute are desired for a person requiring 1000 cc. of gaseous fluid, the number 12 on the speed scale will be brought into registry with the number 12 on the volume scale, the operator turning the handles faster or slower in order to make the numbers correspond. He will then maintain a rate of speed which will keep the numbers in registry.

Air at atmospheric pressure and gas previously reduced to practically atmospheric pressure are available at the respective intake valves. The gas intake valve prevents any pressure substantially above outside atmospheric pressure from being transmitted inside the resuscitator. Turning the mixing valve to admit air causes suction transmitted through said valve to draw in air. Turning it to admit gas causes the suction to draw gas into the mixing valve at approximately the same pressure as the air. Because the pressures are approximately equal, the ratio is easily controlled.

The cylinder pistons are moved regularly and steadily, as the rotary motion is constant, and not intermittent. Regardless of the volume of gas or air used, the pistons always go to the same point at the end of their stroke. The only variable is at the top of the piston movement, so that changing the volume does not cause any of the gases in the cylinders to be retained in the resuscitator. Each inward stroke of the pistons causes complete exhaustion of the gases in the cylinder.

The air or gas is supplied to the patient in suitable volume at pressures not exceeding twenty millimeters of mercury positive pressure, and equal volumes are taken from the patient at negative pressures (or suction) not exceeding ten millimeters of mercury. This is accomplished by the setting of the positive and negative relief valves. Either valve will open if the respective pressures are exceeded. Due to their floating sleeve construction, there is no chattering, bleeding or fluttering, as the valve cap and seat move together for part of the distance. Thus a slight suction (less than 20 millimeters of pressure for one, 10 for the other) will not tend to open the valves. When the pressure is excessive, the valve plug is stopped, while the sleeve continues to move, thus opening the valve.

The chemical canister may or may not be used, according to the purity or pollution of the atmosphere. The air filter should always be used, though, of course, it is not necessary to the operation of the machine.

The various adjustments which may be made, aside from the volume and mixture controls, are not made during operation, but are pre-set. The various valve stem screws can be reached through removable panels in the casing. Although these are shown, they are not expressly referred to, since their location is largely a matter of choice.

I claim:

1. A resuscitator having an inspiration cylinder and an expiration cylinder, an inlet passage leading to the inspiration cylinder, a gas supply, an air inlet, a mixing valve receiving gas from the gas supply and air from the air inlet and adjustable to vary the proportions thereof, and means to indicate the proportions operated by movement of the mixing valve, said means comprising a drum having identical ascending and descending scales arranged side by side, a housing for the drum having windows, one opening over a figure of one scale and another over a figure of another scale, the window for one scale being offset from the window of the other scale so that the figure of one scale is readable at the same time as the figure of the other scale next below it.

2. In a resuscitator having an inspiration cylinder and an expiration cylinder, pistons in said cylinders, rotary operating means therefor, a rotary governor operated by the rotary operating means, a calibrated drum, connections from the governor to the drum, whereby the speed of operation is indicated, a second calibrated drum adjacent the first, a housing having a window therein through which calibrations on both drums are visible simultaneously, hand-operated means for varying the stroke of the pistons and connections from said means to said second drum whereby the drum is moved to indicate variations in the piston stroke.

3. In a resuscitator having an inspiration and an expiration cylinder, pistons in the cylinders, rotary operating means therefor, speed-indicating means connected to and operated by said means, means for varying the stroke of the pistons and volume-indicating means connected to the means for varying the stroke of the pistons.

4. In a resuscitator having an inspiration and an expiration cylinder, pistons in the cylinders, rotary operating means therefor, speed-indicating means connected to and operated by said means, means for varying the stroke of the pistons and volume-indicating means connected to the means for varying the stroke of the pistons, said indicating means being placed adjacent each other and observable simultaneously.

5. In a resuscitator having an inspiration and an expiration cylinder, pistons in the cylinders, rotary operating means therefor, means for varying the stroke of the pistons, volume-indicating means connected to the means for varying the stroke of the pistons, said indicating means including a calibrated drum, a rotary governor operated by the rotary operating means, and speed-indicating means connected to and operated by the governor, said last mentioned indicating means also including a calibrated drum, located beside said first-mentioned drum, and observable simultaneously therewith.

6. In a resuscitator having a casing with a window in it, an inspiration and an expiration cylinder, pistons in the cylinders, rotary operating means therefor, means for varying the stroke of the pistons, speed-indicating means connected to the means for varying the stroke of the pistons, a rotary governor operated by the rotary operating means, and volume-indicating means connected and operated by the governor and observable simultaneously with the speed indicating means through the window in the casing.

CHESTER C. RAUSCH.

REFERENCES CITED

The following references are of record in the file of this patent:

UNITED STATES PATENTS

| Number | Name | Date |
|---|---|---|
| 514,448 | Desant | Feb. 13, 1894 |
| 552,387 | Moffatt | Dec. 31, 1895 |
| 664,947 | Hanna | Jan. 1, 1901 |
| 1,012,687 | Melton | Dec. 26, 1911 |
| 1,107,414 | Deray | Aug. 18, 1914 |
| 1,157,655 | Mayer | Oct. 19, 1915 |
| 1,234,587 | Weatherly | July 24, 1917 |
| 1,292,457 | Hall | Jan. 28, 1919 |
| 2,220,672 | Bloomheart | Nov. 5, 1940 |
| 2,259,587 | Rush | Oct. 21, 1941 |